(12) United States Patent
Nakamura

(10) Patent No.: US 7,840,430 B2
(45) Date of Patent: Nov. 23, 2010

(54) RISK EVALUATION SUPPORT DEVICE, PROGRAM PRODUCT AND METHOD FOR CONTROLLING SAFETY NETWORK RISK EVALUATION SUPPORT DEVICE

(75) Inventor: Toshiyuki Nakamura, Kyoto (JP)

(73) Assignee: OMRON Corporation, Kyoto (JP)

( * ) Notice: Subject to any disclaimer, the term of this patent is extended or adjusted under 35 U.S.C. 154(b) by 789 days.

(21) Appl. No.: 11/221,043

(22) Filed: Sep. 6, 2005

(65) Prior Publication Data
US 2006/0038688 A1    Feb. 23, 2006

Related U.S. Application Data

(63) Continuation of application No. PCT/JP03/02703, filed on Mar. 7, 2003.

(30) Foreign Application Priority Data
Mar. 7, 2002   (JP) .................... 2002-62594

(51) Int. Cl.
*G06F 17/50* (2006.01)
(52) U.S. Cl. ............... 705/7; 700/253; 700/258
(58) Field of Classification Search ......... 705/7; 700/253, 258
See application file for complete search history.

(56) References Cited

U.S. PATENT DOCUMENTS

| | | | | |
|---|---|---|---|---|
| 3,953,770 A | * | 4/1976 | Hayashi | 361/179 |
| 4,300,121 A | * | 11/1981 | Fritzsche | 340/928 |
| 4,332,989 A | * | 6/1982 | Nicolaisen | 200/47 |
| 4,477,184 A | * | 10/1984 | Endo | 356/141.1 |
| 4,517,554 A | * | 5/1985 | Moser et al. | 340/514 |
| 5,280,622 A | * | 1/1994 | Tino | 700/255 |
| 5,471,214 A | * | 11/1995 | Faibish et al. | 342/70 |
| 6,285,925 B1 | * | 9/2001 | Steffen | 701/2 |
| 6,463,352 B1 | * | 10/2002 | Tadokoro et al. | 700/169 |
| 6,778,092 B2 | * | 8/2004 | Braune | 340/679 |
| 6,979,813 B2 | * | 12/2005 | Avril | 250/221 |
| 7,061,379 B2 | * | 6/2006 | Chen et al. | 340/572.1 |
| 7,403,868 B2 | * | 7/2008 | Maekawa et al. | 702/182 |

OTHER PUBLICATIONS

Valdez, Diaz and Tadeo, Alfredo. Life-saving alarm for persons in a water medium. European Patent No. 484184. May 6, 1992.*
Patent Abstracts of Japan, Publication No. 09-160635, *Process Safety Evaluation Procedure Preparation Device*, Ueda Akio, et al., published Jun. 20, 1997.
International Search Report PCT/JP03/02703, mailed May 27, 2003.

* cited by examiner

*Primary Examiner*—Johnna Loftis
(74) *Attorney, Agent, or Firm*—Weaver Austin Villeneuve & Sampson LLP

(57) ABSTRACT

A risk evaluation support device is used for a safety network which serves to cause an output device to make a controlled device operable based on a detection signal outputted from an input device when the input device detects a safety condition. The support device creates a parameter setting table for correlating a danger source with the input and output devices and a PLC for risk evaluation based on configuration data of the safety network obtained through a communication part and device data on devices obtained from a component database. Operating data for the safety network are obtained according to conditions provided by the parameter setting table and a current risk evaluation value for the danger source is calculated based on the obtained operating data. The calculated risk evaluation value is outputted to a display part.

12 Claims, 11 Drawing Sheets

<DEVICE DATA>

Vendor registered data

* Device name: Output slave
* Maker name: A, Inc.
* Form: XXX
* Finite-lifetime component: Relay A
* Lifetime: 100000 times User registered data

* Set position: Area A
* Process name: Assembly A
* Object of control: Robot A
* Scale of danger: Level 4
* Set value of safety distance: 3m
* Frequency of approach: Level 2
* Voltage value: 24V
* CAN error: 2x
* 0ch: Robot A
* 1ch: ----
   etc.

*FIG. 5*

| S Rank | Standard |
|---|---|
| 1 | Treatment at an infirmary |
| 2 | Treatment at a hospital |
| 3 | Treatment as out-patient at a hospital |
| 4 | Treatment as in-patient at a hospital |
| 5 | Death or disablement |

FIG. 6

| F Rank | Standard |
|---|---|
| 1 | Once or more/year - less than once/month |
| 2 | Once or more/month - less than once/week |
| 3 | Once or more/week - less than once/day |
| 4 | Once or more/day - less than once/hour |
| 5 | Once or more/hour |

FIG. 7

Setting of monitoring conditions for frequency of approach

Danger source: Robot A

Monitoring condition for frequency of approach:
☒ Monitoring to be done
☐ Monitoring not to be done (set value is used as fixed for calculation)

Monitoring method:
☒ Frequency of approach F
☐ Total time T

Monitoring method: Input slave / #4 / 1ch

Comment: Count frequency of opening the door DOORSW_A as the frequency of approach.

FIG. 11

| Work step | Area A Assembly A | | | |
|---|---|---|---|---|
| Danger source | Robot A | | Conveyer A | |
| Scale of danger S | 4 | | 3 | |
| Frequency of Approach F<br>   Set value<br>   Current value | 2 | | 2 | |
| Total time T<br>   Set value<br>   Current value | | | | |
| Safety devices<br>Device name<br>Maker name<br>Form<br>Address<br>Ch<br>ON-condition | Output slave<br>A Inc.<br>XXX<br>#0<br>0ch  1ch<br>E-STOP_A*DOORSW_A | Input slave<br>A Inc.<br>ZZZ<br>#4<br>0ch  1ch | Output slave<br>A Inc.<br>XXX<br>#0<br>2ch  3ch<br>E-STOP_A*DOORSW_A | Input slave<br>A Inc.<br>ZZZ<br>#4<br>0ch  1ch |
| Observation parameters<br>(probability of occurrence P) | | | | |
| Safety distance<br>   Set value<br>   Current value | 3m | | 1m | |
| CAN error<br>   Set value<br>   Current value | 2x | 2x | 2x | 2x |
| Power supply source<br>   Set value<br>   Current value | 24V | 24V | 24V | 24V |
| Finite-lifetime component | Relay A/<br>Relay A | | Relay A/<br>Relay A | |
| Lifetime<br>   Set value<br>   Current value | 100000x/<br>100000x | | 100000x/<br>100000x | |

FIG. 10

| Risk parameters | |
|---|---|
| Risk element | Observation parameter |
| Deterioration of mechanical parts and mechanical components (lifetime) | Change in response time, frequency of opening and closing, return voltage of internally contained relay |
| Deterioration of mechanical parts and mechanical components (change in safety distance) | Change in response time |
| Defect in external power supply source, breaking of power source line, loosening of terminal, etc. | Change in supply voltage |
| Erroneous operation due to adverse setting environment and locations | CAN error frequency and address of network device with large CAN error frequency |

FIG. 12

| F Rank | Standard |
|---|---|
| 1 | Measured value < Set value x 0.2 |
| 2 | Set value x 0.2 ≤ Measured value < Set value x 0.4 |
| 3 | Set value x 0.4 ≤ Measured value < Set value x 0.6 |
| 4 | Set value x 0.6 ≤ Measured value < Set value x 0.8 |
| 5 | Set value x 0.8 ≤ Measured value |

FIG. 13

Setting of alarm condition

Danger source: Robot A

Alarm condition:

☒ Threshold value: Risk R after calculation ≥ 50
☐ Rate of change: Change in risk after calculation ≥ —
☒ Setting of observation parameter over Method of alarm output:

☒ Screen display only (file output)
☒ Issue stop command
  ☐ Entire system    ☒ Danger source only Processing after alarm output:

☐ Continue with data log
☒ Stop data log

FIG. 14

| Work step | Area A Assembly A | | | |
|---|---|---|---|---|
| Danger source | Robot A | | Conveyer A | |
| Scale of danger S | 4 | | 3 | |
| Frequency of Approach F<br>  Set value<br>  Current value | 2<br>2 | | 2<br>2 | |
| Total time T<br>  Set value<br>  Current value | | | | |
| Safety devices<br>Device name<br>Maker name<br>Form<br>Address<br>Ch<br>ON-condition | Output slave<br>A Inc.<br>XXX<br>#0<br>0ch  1ch<br>E-STOP_A*DOORSW_A | Input slave<br>A Inc.<br>ZZZ<br>#4<br>0ch  1ch | Output slave<br>A Inc.<br>XXX<br>#0<br>2ch  3ch<br>E-STOP_A*DOORSW_A | Input slave<br>A Inc.<br>ZZZ<br>#4<br>0ch  1ch |
| Observation parameters<br>(probability of occurrence P) | | | | |
| Safety distance<br>  Set value<br>  Current value | 3m<br>2.8m | | 1m<br>0.8m | |
| CAN error<br>  Set value<br>  Current value | 2x<br>0x | 2x<br>1x | 2x<br>3x | 2x<br>1x |
| Power supply source<br>  Set value<br>  Current value | 24V<br>24V | 24V<br>24V | 24V<br>24V | 24V<br>24V |
| Finite-lifetime component | Relay A/<br>Relay A | | Relay A/<br>Relay A | |
| Lifetime<br>  Set value<br><br>  Current value | 100000x/<br>100000x<br>40x/40x | | 100000x/<br>100000x<br>150x/150x | |

*FIG. 15*

RISK EVALUATION SUPPORT DEVICE, PROGRAM PRODUCT AND METHOD FOR CONTROLLING SAFETY NETWORK RISK EVALUATION SUPPORT DEVICE

This application is a continuation of International Application No. PCT/JP2003/02703, filed Mar. 7, 2003, which claims priority based on Japanese Patent Application 2002-62594 filed Mar. 7, 2002.

BACKGROUND OF THE INVENTION

This invention relates to a risk evaluation support device and a program product, as well as a method of controlling a risk evaluation support device for a safety network.

As is well known, a network system connecting a programmable controller (PLC) and a slave through a network such as a device network is structured for a factory automation (FA) system. The slave is provided with a plurality of I/O units and sensors, relays and apparatus of various other kinds are connected to these I/O units such that sensing data detected by input devices (such as switches and sensors) connected to a slave, for example, are taken in by the PLC through the network. The PLC serves to analyze the obtained sensing data and to transmit control commands to the output devices (such as relays, valves and actuators) to be operated on the basis of these sensing results.

At factories such as production factories where such a factory automation system is actually installed, on the other hand, it is becoming a common practice to improve the environmental conditions of the work site and to reduce the risks to the workers. A safe accident-free workplace environment means the absence of reduction in productivity caused by system stoppage due to the occurrence of accidents and it eventually leads to an improved production efficiency.

In order to thus reduce the risk to the workers, attempts are being made to identify danger sources of control systems, to carry out risk evaluations (such as the frequency of approach to a danger source and the magnitude of injury in the case of a contact) and to carry out a countermeasure but many of these countermeasures are being realized by introducing safety devices for a safety network system supplied by vendors to construct a factory automation system.

In the above, safety devices mean devices for forming a safety (failsafe) system such as those that will operate a (safety) failsafe function when the network system comes to be in a danger condition, for example, as an emergency stop button has been pressed or a sensor such as a light curtain has detected the entry of a person (or a body part) such that the system will operate on a safe manner, or stop the operations.

For carrying out such a safety operation, the positional relationship (or separation distance) between the machine equipment controlled by the related output device and the input device becomes an important factor.

FIG. 1 shows a robot as an example of machine equipment controlled by an output device where its range of operation becomes a danger area 1. In this situation, a pair of light transmitter 2a and a light receiver 2b is set as an input device in front of this danger area 1. It will be assumed that walls, etc. are so set up that a worker 3 will have to pass between this light transmitter 2a and the light receiver 2b in order to penetrate into the danger area 1.

This means that the worker 3 will necessarily pass through the optical axis 4 of the light transmitted from the light transmitter 2a before reaching the danger area 1. When the light receiver 2b becomes unable to receive light from the light transmitter 2a, the safety system for this case concludes that the worker 3 has passed and switches off a warning signal. (The warning signal remains switched on under a safe condition and is switched off at the time of a danger.) The detection signal is eventually transmitted to the output device through the network and the output device serves to stop the operations of the machine equipment functioning within the danger area 1.

In other words, there is a certain time lag from the moment when the light receiver 2b detects the worker 3 passing until the machine equipment is actually stopped. This time lag necessarily includes at least the total of the internal processing times by the input device and the output device and the communication times of various data on the network.

Thus, if the aforementioned total time is shorter than the time required for the worker 3 to reach the danger area 1 after passing between the light transmitter 2a and the light receiver 2b (the distance of walking/the speed of walking), the machine equipment can be stopped before the worker 3 reaches the danger area 1. When the system is designed, therefore, this is taken into consideration such that the internal processing times of the input and output devices are set to become shorter or the distance of walking (from the position of detection by the input device to the danger area 1) such that the system (machine equipment) can be dependably stopped at the time of an abnormality.

If the necessary distance between the position of detection by the input device and the danger area 1 for carrying out a safety operation is defined as the minimum safety distance S, this may be obtained as $$S = K \times T$$

where K is the speed of walking such as 1 m/sec and T is the time required for stopping the operations (or the response time of the network), or $$S = K \times T + C$$

where C is an additional distance.

The network response time depends on the system configuration. In the case of a system configured such that the detection signal from the input device is transmitted first to the PLC and the result of process by this PLC is transmitted next to the output device, the system response time is given as the response time of the input device plus the communication cycle time plus the internal processing time by the controller plus the communication cycle time plus the response time of the output device.

Prior art systems of this type had problems of the following kind.

For example, when an actual safety system is be built by using a network, the delay time related to the communication and the processing times by the input and output devices must be reflected in the safety distance, as explained above. It is not a simple task, however, to identify the devices that form the network system related to the machine equipment and to obtain the internal processing time of each of them, that is, the input device, the PLC and the output device. As a result, the safety distance may be calculated based on a general value and that may not necessarily be close to the true value.

Even if a safety distance could be obtained for a real system, this does not mean that it is 100% safe but there necessary remains a residual risk because operations at the time of a defect must be taken into consideration and there are faulty operations due to adverse setting conditions. Moreover, if the response time becomes long due to changes caused by elapsed time, the required minimum safety distance S becomes longer accordingly and the risk will increase if no change is made from the time of the initial setting.

It has been difficult, however, to grasp and evaluate such a residual risk numerically accurately. In other words, conventional methods of evaluation depended mainly on investigations of records of the accident or interviews with victims and hence the data were not reliable.

For reasons of security maintenance and management, risk reevaluations were being carried out but since evaluations are difficult to make unless visible events such as an accident that has actually occurred are investigated, it was not possible to consider the invisible increase in risk due to the elapse of time until the time of reevaluation, to make it visible or to establish a preventive countermeasure against such a risk.

Thus, if an accident occurs, the system may be investigated again on the basis of it such that devices may be exchanged or a safety distance may be corrected but it was not possible to take any measures against any increased risk before the occurrence of an accident so as to prevent the actual occurrence of the accident.

SUMMARY OF THE INVENTION

It is therefore an object of the present invention in view of the background as described above to provide a risk evaluation support device and a computer readable program product as well as a method of controlling a risk evaluation support device for a safety network such that risk evaluation of safety networks that are actually set can be correctly carried out.

A risk evaluation support device embodying this invention in view of the object described above may be characterized as being for a safety network serving to cause an output device to make a controlled device operable based on a detection signal outputted from an input device when this input device detects a safety condition and comprising table creating means for creating a parameter setting table for risk evaluation based on configuration data of the safety network and device data on devices that form the safety network, this parameter setting table correlating a danger source with the input device and the output device, data obtaining means for obtaining operating data for the safety network according to conditions provided by the parameter setting table for risk evaluation, calculating means for calculating a current risk evaluation value for the danger source based on the obtained operating data, and outputting means for outputting data related to the risk evaluation value calculated by the calculating means.

In the above, the table creating means may be realized by a function for carrying out the flowchart shown by FIG. 8 below, the data obtaining means may be realized by a function for carrying out the flowchart shown by FIG. 9 below and the calculating means may be realized by a function for carrying out Steps ST12 and 13 of the flowchart of FIG. 9. The output means is shown below as making outputs to a display part but this is not intended to limit the scope of the invention. Outputs may be made to a printing means such as a printer or a device for writing into a recording medium or making outputs through a communication medium.

Since a parameter setting table for risk evaluation is created based on actual network configuration, etc. according to this invention, it can be easily learned from such a table what data should be obtained from which device at the time of an actual system operation. Since a risk evaluation value is obtained based on data thus obtained, it is possible to make an evaluation suitable to an actual safety network system.

As for the calculation of a risk evaluation value, although it is effective to obtain it after the system has actually operated to a certain extent and to monitor the change of risk accompanied by the elapse of time, this does not limit the scope of the invention. The invention is also applicable when a risk evaluation value is obtained under the initial condition of a system when the system is initially set as it is designed such that a judgment can be made whether it is safe or not.

There are various conditions under which a risk evaluation value may be actually obtained. The calculating means, for example, may be adapted to calculate the risk evaluation value based at least on the scale of injury by the danger source. The parameter setting table may be adapted to store standard setting values of observation parameters and the calculating means may be adapted to obtain current values of the observation parameters based on the obtained operating data and to calculate the current risk evaluation value for the danger source at least from the current value and the standard setting values.

The calculating means may be adapted to calculate the risk evaluation value at least based on data related to the frequency of approach to the danger source, but it goes without saying that these examples are not intended to limit the scope of the invention. The risk evaluation value may be obtained from different conditions and also from various combinations of these conditions.

It is preferable to provide the function of outputting an alarm when the risk evaluation value exceeds a preliminarily specified threshold value. Although such an alarm-outputting function is not indispensable, the user can learn from such an alarm that the risk of the safety network has become high and the time has come for taking an adequate countermeasure.

The invention also relates to a computer readable program product for carrying out risk evaluation for a safety network serving to cause an output device to make a controlled device operable based on a detection signal outputted from an input device when this input device detects a safety condition. A program product of this invention may be characterized as comprising program parts carrying out the steps of obtaining configuration data of the safety network and device data on devices that form the safety network and creating a parameter setting table for risk evaluation based on the obtained configuration data of the safety network and device data, the parameter setting table correlating a danger source with the input device and the output device, obtaining operating data for the safety network according to conditions provided by the parameter setting table for risk evaluation, calculating a current risk evaluation value for the danger source based on the obtained operating data, and outputting data related to the risk evaluation value.

The invention further relates to a method of controlling a risk evaluation support device for a safety network serving to cause an output device to make a controlled device operable based on a detection signal outputted from an input device when this input device detects a safety condition. A method of this invention may be characterized as comprising the steps of obtaining configuration data of the safety network and device data on devices that form this safety network, creating a parameter setting table for risk evaluation based on the obtained configuration data of the safety network and the device data, the parameter setting table correlating a danger source with the input device and the output device, obtaining operating data for the safety network according to conditions provided by the parameter setting table for risk evaluation, calculating a current risk evaluation value for the danger source based on the obtained operating data, and outputting data related to the risk evaluation value.

BRIEF DESCRIPTION OF THE DRAWINGS

FIG. 5 is an example of data structure for the device database.

FIG. 6 is a table for showing injury scale.

FIG. 7 is a table for showing the standard of approach frequency.

FIG. 10 shows an example of data structure of a parameter setting table for risk assessment.

FIG. 11 shows an example of approach frequency monitoring condition setting screen.

FIG. 12 shows risk parameters.

FIG. 13 shows a standard for the probability of occurrence of dangerous phenomenon.

FIG. 14 is an example of alarm condition setting screen.

FIG. 15 shows an example of data structure of a parameter setting table for risk assessment.

DETAILED DESCRIPTION OF INVENTION

The invention is described next with reference to the drawings.

Figure 2:
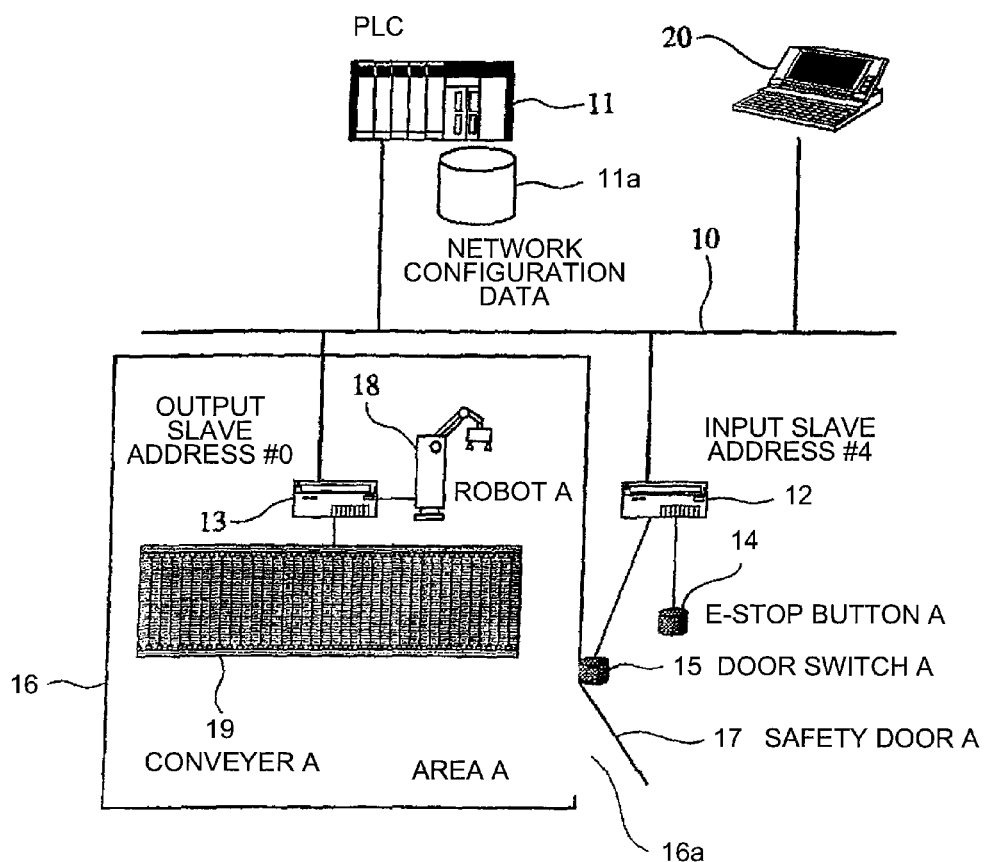
FIG. 2 is a block diagram of an example of safety network to which the present invention may be applied.

FIG. 2 shows an example of a safety network system where a support tool embodying this invention is used. As shown, a programmable controller (PLC) 11, an input slave 12 and an output slave 13 that form safety devices are connected to a control network 10 such that data communications can be carried out among these safety devices through this network 10.

An emergency stop button 14 and a door switch 15 are connected to an I/O terminal of the input slave 12, and a robot 18 and a power switch device for switching on and off the power source for a transporting device (conveyer) 19 are connected to an I/O terminal of the output slave 13. The robot 18 and the conveyer 19 are assumed to be set within a certain area (referred to as Area A) in a production factory surrounded by a partition wall 16 having an opening 16a provided with a safety door 17 adapted to block it. The aforementioned door switch 15 is for detecting the closing of this safety door.

With a system thus structured, the safety door 17 is normally maintained in the closed condition during a system operation. This means that the interior of Area A is blocked from the exterior by means of the partition wall 16 and the safety door 17, people being prevented from entering. If the safety door 17 is opened under this condition, it may be concluded that somebody has invaded Area A and the robot 18 and the conveyer 19 operating within this danger area must be stopped for the safety objective. Thus, if the door switch 15 detects the opening of the safety door 17, its output is transmitted to the PLC 11 through the input slave 12, causing the PLC 11 to transmit a stop command for object devices to be controlled (that is, the robot 18 and the conveyer 19) to the output slave 13. The output slave 13, upon receiving this stop command, serves to switch off the object power source to be controlled and its operation stops.

In order to construct such a network system, it is necessary not only to connect various devices physically to the network but also to assign the module number of each I/O of each device (the input slave 12 and the output slave 13) to a memory (address) of the PLC 11 and to carry out programming processes to form programs to determine what kind of calculation processes should be performed by the PLC 11.

In order to construct a safety network, furthermore, it is necessary to additionally carry out various setting operations for realizing various safety functions. Explained in connection with the present invention, the system will be set on a safe side and the actions will be stopped when the network system is in a danger condition such that the door switch 15 has detected the opening of the safety door 17, the emergency stop button has been pressed or the entry of a person is detected by a sensor such as a light curtain, but the internal processing times and safety distances of various devices are set such that the operation will be stopped within a specified time (before the person entering reaches the danger area). This is done by using a programming tool (not shown), that is, by downloading developed programs and data such as various parameters to specified devices.

In this way, network configuration data (or data showing which and which devices are transmitting and receiving data and assigned to which memory device) come to be stored, for example, in a memory device 11a inside the PLC 11.

A support tool 20 according to this invention is connected to the network 10, having the functions of obtaining the aforementioned network configuration data stored in the memory device 11a of the PLC 11, carrying out the risk evaluation of the safety network and setting necessary data for monitoring in each of the safety devices.

Figure 3:
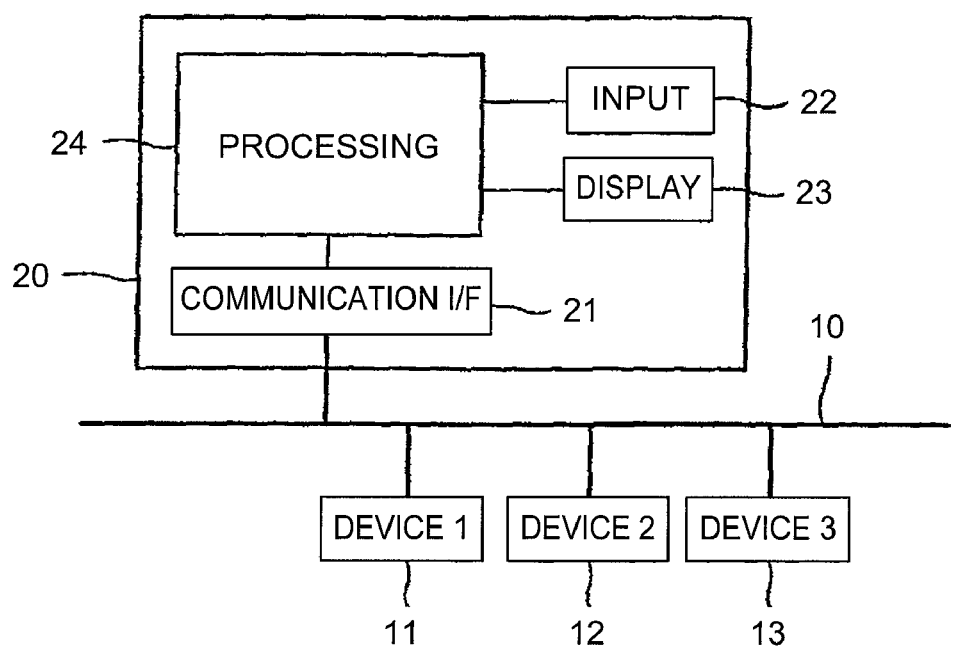
FIG. 3 is a block diagram of a support tool of this invention.

FIG. 3 shows a detailed structure of the support tool 20, provided with a communication interface part 21 for connecting to the network 10 for communicating with various kinds of devices, an input part 22 which may comprise a keyboard and a pointing device such as a mouse, a display part 23 which may comprise a monitor, and a processing part 24 adapted to carry out risk evaluations by means of a specified calculation process based on data provided from the input part 22 or obtained through the communication interface part 21 and setting necessary data at each device through the network 10.

Figure 4:
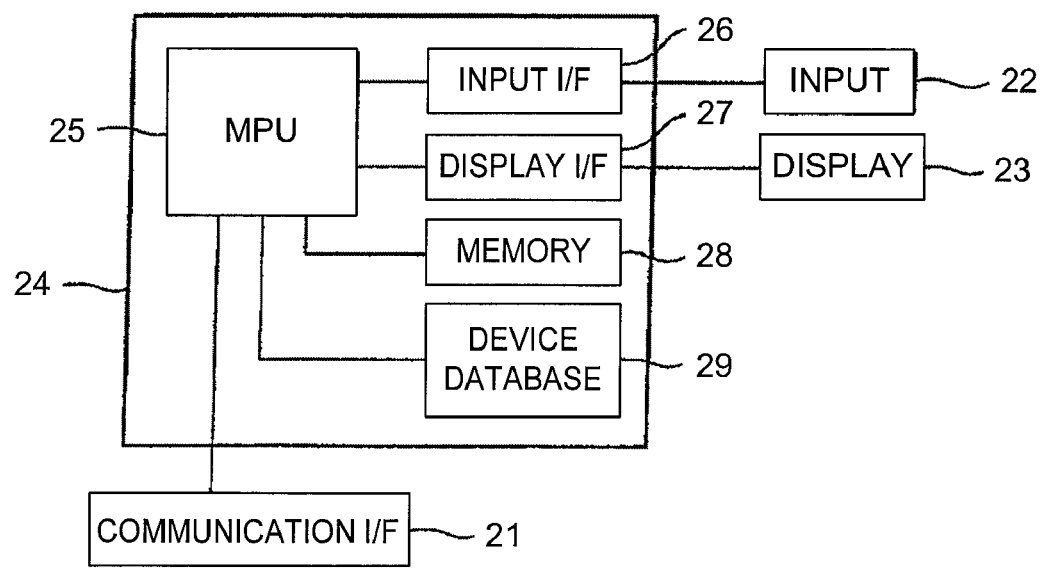
FIG. 4 is a block diagram for showing the internal structure of the processing part of the support tool of FIG. 3.

As shown in FIG. 4, the processing part 24 is provided with an MPU 25 for carrying out various calculation processes, an input interface 26 for connecting the MPU 25 with the input part 22, an output interface 27 for connecting the MPU 25 with the display part 23, a memory 28 serving as a work area (work memory) when the MPU 25 carries out a calculation process and storing the risk assessment parameter setting table obtained by a calculation process by the MPU 25 and a device database 29.

The device database 29 is for storing characteristic data on each device connected to the network 10, provided by the vendor such as device name, maker name, form, finite-lifetime component and useful lifetime, as shown in FIG. 5, as well as user registered data (device parameters) registered by the user for specifying the setting environment of the device.

User registered data are data which are used also when the network configuration is set by using the tool device (network configuration tool). Those that have been created by this tool device may be obtained. If data are stored as the network configuration data by the memory device 11a of the PLC 11, such data may be obtained. They may also be obtained from a different database.

The user registered data are preliminarily registered by operating on the input part 22. Among these, the injury scale is for indicating the magnitude of the injury that could result if a person contacted a machine while the device in question is in operation. Explained more in detail, standardized numbers defined as shown in FIG. 6 are registered. For example, if the injury to a person erroneously coming into contact with the machine is light enough and may be treated at the infirmary of the factory, numeral "1" will be entered, but if it is serious enough and can be fatal, numeral "5" will be entered.

"Set safety distance" means the safety distance that is actually set at the production factory. For example, the actual distance from the detection position by the input device (or the position of the opening 16a or the safety door 17 in the example of FIG. 2) and the danger area (or the range of motion by the conveyer and the robot 18 in the example of FIG. 2) is entered.

"Approach frequency" is where the frequency at which the danger area (or the danger source" is approached is registered, and a standardized number as defined in FIG. 7 is entered. The upper limit of an allowed range is in the column for "Voltage" and "CAN error".

The names of devices connected to each channel may be registered through the input part 22 but since these are data to be used also when a network configuration is set by means of the tool device (network configuration tool), they may be obtained from the tool device like the vendor registered data or from the network configuration data of the memory device 11a.

The device data to be registered in this device database 29 are usually preliminarily registered but a portion or the whole of the user registered data may be left unregistered and registered at the time of the risk evaluation. It goes without saying that these data should be appropriately updated according to the actual operating conditions because the data on injury scale and approach frequency are originally entered based on predictions that are made when the system is initially set up.

Figure 8:
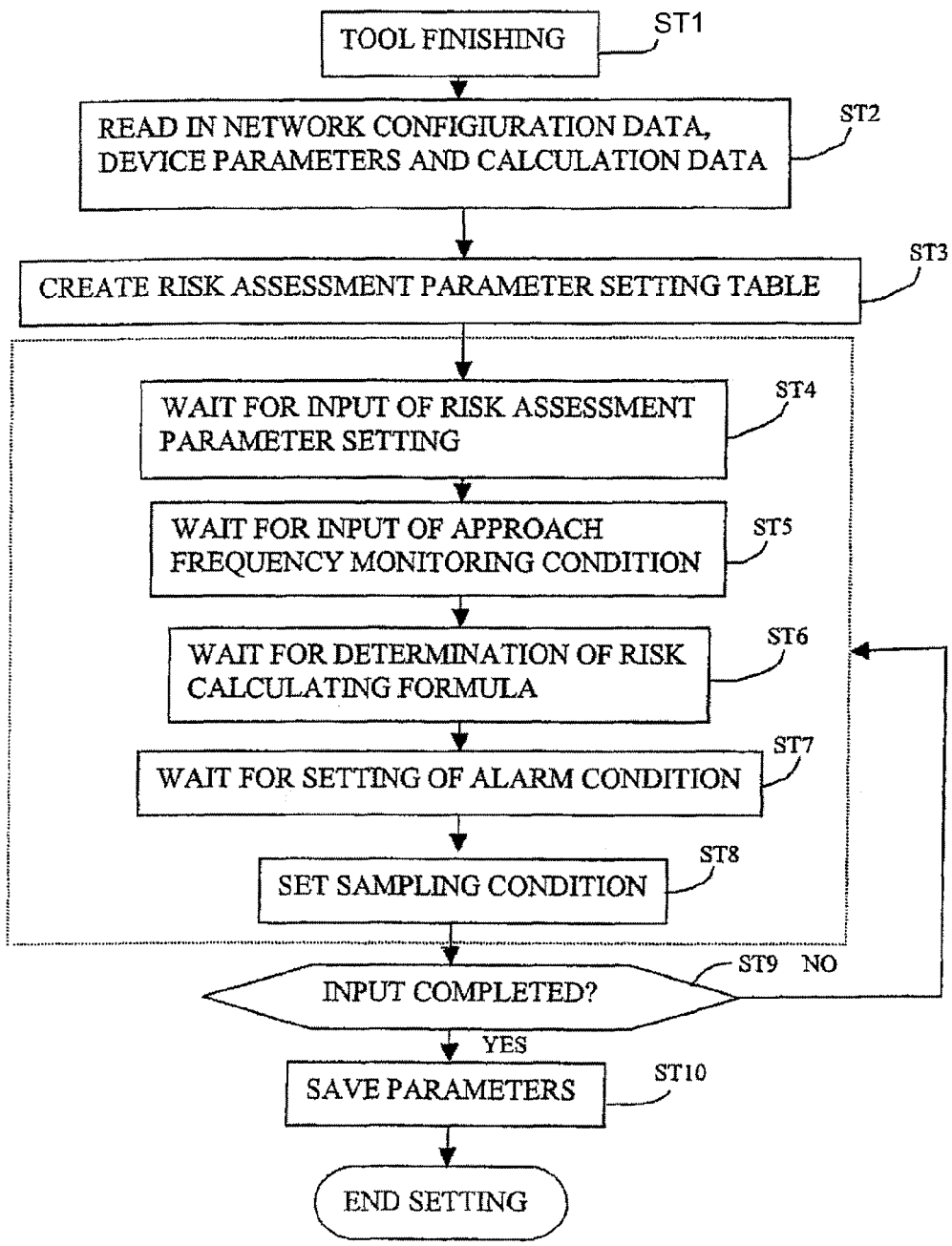
FIGS. 8 and 9 are flowcharts for the operations of the MPU.
Figure 9:
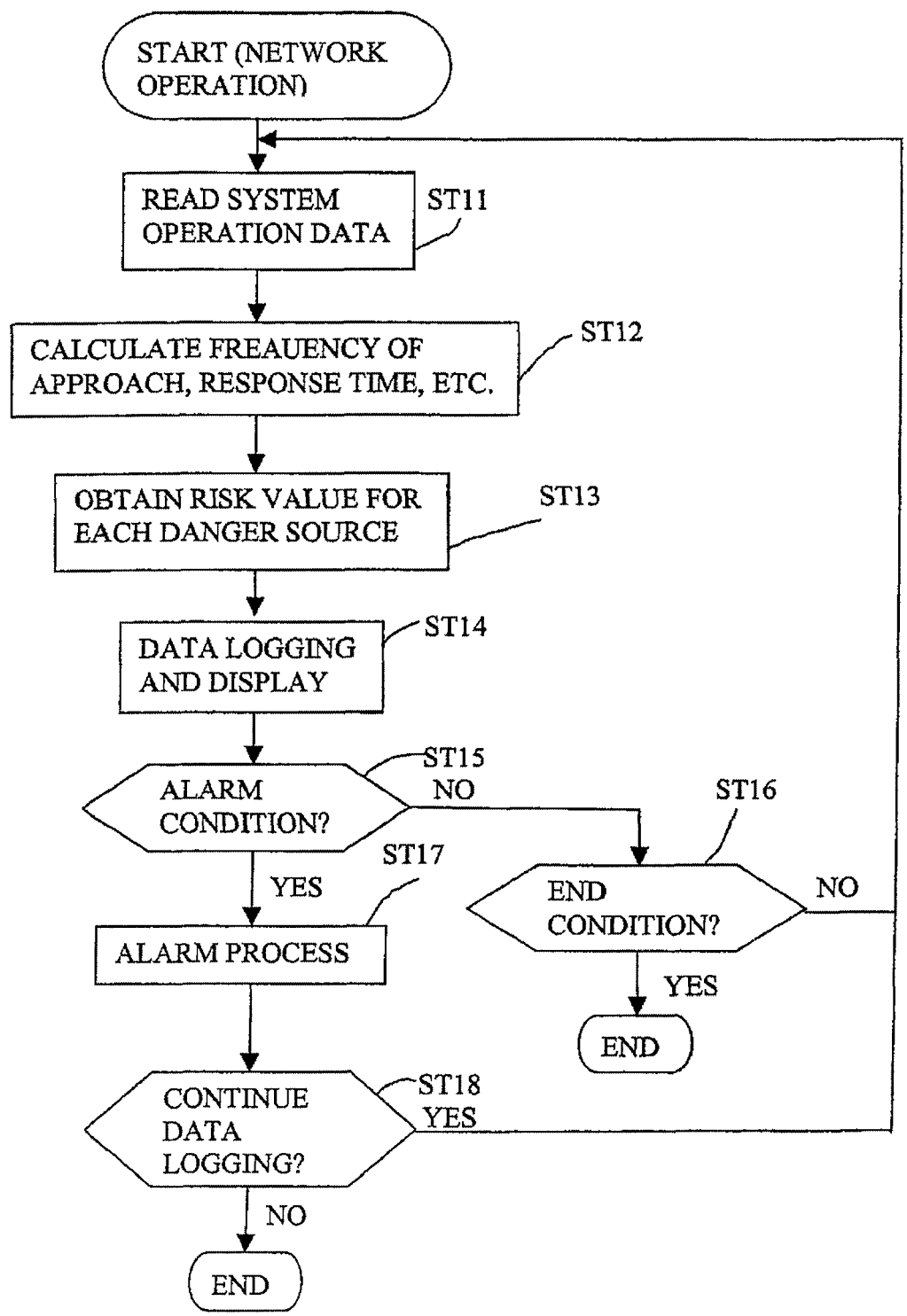

The MPU 25 is provided with a setting function as shown by the flowchart of FIG. 8 and a function for risk analysis and warning as shown by the flowchart of FIG. 9.

The flowchart of FIG. 8 starts by starting the support tool (Step ST1) and reading in the network configuration data, device parameters and calculation data (Step ST2). The network configuration data may be read out of the memory device 11a of the PLC 11 for obtaining the connection configuration of the safety network which is the object of risk evaluation but they may also be obtained from a tool device (network configuration tool). The device parameters are for each of the slaves and relate to their positions, the names of process steps for which they are set, the objects of control, approach frequencies, injury scales and set values of safety distance. They are obtained by reading out from the device database 29 although they may be added and modified during a later process. The calculation data include calculation formulas and parameters to be used for risk evaluation as will be explained more in detail below. They are read out from the memory device 28 where they are stored.

Danger sources are correlated with the input and output devices and a risk assessment parameter setting table is created (Step ST3). Explained more in detail, this is completed by carrying out Steps ST4-ST8.

As shown in FIG. 10, the risk assessment parameter setting table includes various items such as "process step", "danger source", "injury scale", "approach frequency", "total time" and "observation parameter" and it is created by reading templates with corresponding formats and registering obtained data appropriately in corresponding spaces (Step ST4). Spaces with no corresponding data are left empty. Since it can be understood from the network configuration under what input conditions a stop command for an operation will be outputted, such condition is registered as the "ON condition". The set values for "approach frequency", "total time" and "observation parameter" are values registered as device data. Each set value of "observation parameter" is the allowed limit value such that if the current value exceeds this limit value, the risk is considered high and the condition becomes abnormal.

Next, the approach frequency monitoring condition is inputted (Step ST5). A setting screen as shown in FIG. 11 is outputted to and displayed on the display part 23 and an approach frequency monitoring condition is set for each danger source. It is to be understood that FIG. 11 shows the screen after necessary inputs have been completed. In the initial display, the rectangular frames are empty and the filled (or crossed) squares are still left empty (white). The entry of the danger source may be made by the user or it may be so arranged that the danger sources are sequentially extracted from the risk assessment parameter setting table of FIG. 10 and automatically displayed according to the corresponding danger source.

On this setting screen thus displayed, the user selects an approach monitoring condition (whether or not monitoring is done by using the approach frequency setting value as a fixed value) and a monitoring method (approach frequency or total time) by clicking on a corresponding empty (white) square.

If the selection is made for carrying out the monitoring, the approach frequency and time are calculated by monitoring the approach of a person to the danger source or OFF frequency or time of input signal.

A monitoring position, etc. are further specified. If the monitoring position is preliminarily known from the network configuration data, this may be read out and displayed. Such a display may be used to make changes.

Next, risk calculating formulas are determined (Step ST6). Risk elements to be used for obtaining risk evaluation values include deterioration (useful life times) of mechanical parts and mechanical components, changes in the safety distances, defects in the external power source, breakage of the power supply line, loosing terminals and malfunctions due to adverse setting environment. In other words, risk increases as the use frequency and time increase and the anticipated maximum lifetime is approached. If the response time becomes long due to the deterioration of a mechanical component or the like, the required safety distance becomes longer accordingly and may approach or even exceed the initially set actual safety distance. In other words, risk changes with time. The relationship between a risk parameter and a monitored parameter becomes as shown in FIG. 12.

In Step ST6, risk calculating formulas are determined for numerically representing a risk evaluation value R for the system based on the aforementioned observation parameters. The formula may be in the following form:

$$R = A \times S + B \times (F \text{ or } T \times P) - M$$

where A and B are weight factors to be determined by the user, S is the injury scale, F is the frequency of approach to the danger by a person, T is the total time during a specified period and P is the probability of occurrence of a dangerous phenomenon to be obtained from observation parameters. Approach frequency and time are calculated by monitoring the approach of workers to the danger source or OFF frequency or time of input signal. As the probability of occurrence of the dangerous phenomenon, a number from 1 to 5 is set according to FIG. 13 from the relationship between the setting position of the observation parameter and measured values. The choice between F and T×P is made according to the monitoring method selected in Step ST5. A risk evaluation value is obtained by such a formula for each danger source. Formulas of different forms may be used instead.

In the above, M represents the level of preventive measures. They are not measures being taken to directly affect or to reduce S, F or P but are related to any measure being taken at the work site to reduce the danger and a corresponding numerical value is set. If safety trainings are being carried out at the work site, the risk must be lowered although the actual values of S, F and P may be high. If the use of a protective gear is made mandatory, furthermore, workers may enter a danger area but the level of injury that may be sustained should be lighter. In other words, although the hardware configuration (equipment) may remain the same, the actual level of risk must be significantly different. Thus, the more protect measures are taken, the greater becomes the value of M so as to reduce the final risk evaluation value.

Next, alarm conditions are set (Step ST7) by displaying a setting screen as shown in FIG. 14, and alarm conditions inputted for each danger source are obtained from this screen. Items to be set include (1) alarm conditions, (2) method of alarm output and (3) processing after the alarm output.

Next, sampling conditions (at what frequency risk evaluation should be repeated) are set (Step ST8) and after all input operations are completed (YES in Step ST9), the risk assessment parameters that have been set are stored in the memory 28 (Step ST10) as shown in FIG. 10 with current values left as empty space.

For an actual risk analysis (calculation of risk evaluation values) and a warning process, system operation data are read out (Step ST11) as shown in FIG. 9 as the network is started. The ON/OFF frequencies of I/O of the slave device being controlled, the power-on time, the communication condition (CAN error frequency), supplied voltage, communication cycle times of various devices, the input response time, etc. are obtained, for example, by reading out the operation history stored by the PLC 11 and the slaves 12 and 13 connected to the network 10.

It is also possible to spontaneously obtain the approach frequency by monitoring the data flowing on the network to detect an abnormality detection signal outputted from a specified input slave to the PLC 11 and a stop command outputted to the output slave 13 for controlling the operations of the danger source. Necessary system operating data can also be obtained by monitoring data communication intervals, and such system operating data thus obtained can be stored in the memory 28 or registered at suitable positions in the risk assessment parameter setting table as shown in FIG. 15. The communication time is temporarily stored separately in the memory 28.

Figure 1:
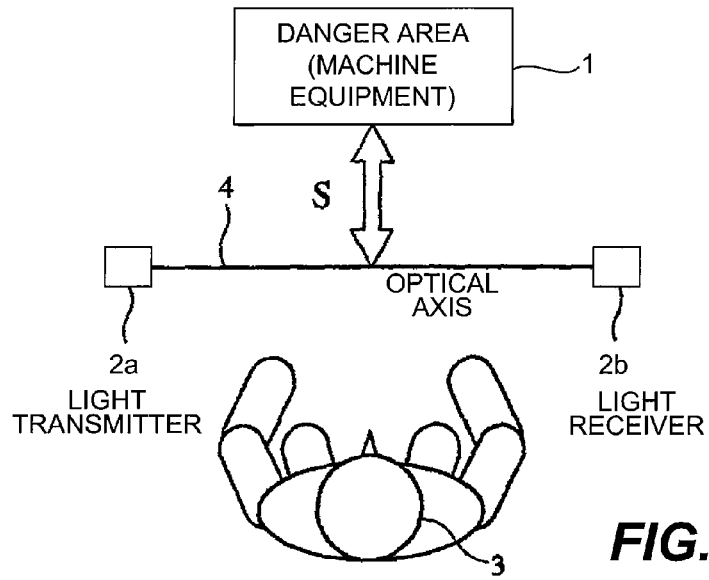
FIG. 1 is a drawing for explaining a safety network system (or its safety distance).

Next, the approach frequency and the response time are calculated (Step ST12). They can be obtained according to the system operation data obtained in Step ST11. The response time is obtained as the total sum of the input device response time, the (first) communication cycle time, the controller internal process time, the (second) communication cycle time and the output device response time in the case of a system where data communications are effected from the input slave 12 to the PLC 11 to the output slave 13 as shown in FIG. 1. In the case of a system where the communication route is directly from the input slave to the output slave, the controller internal process time and one of the communication cycle times become unnecessary.

The current safety distance is also calculated from the calculated response time. This calculation can be done by a nationally standardized safety distance calculation method. The approach frequency can be obtained from the ON/OFF frequency of a specified input slave (input device). If the monitoring method is by the power-on time, the time elapsed to the current time is obtained.

Figures 16A, 16B:
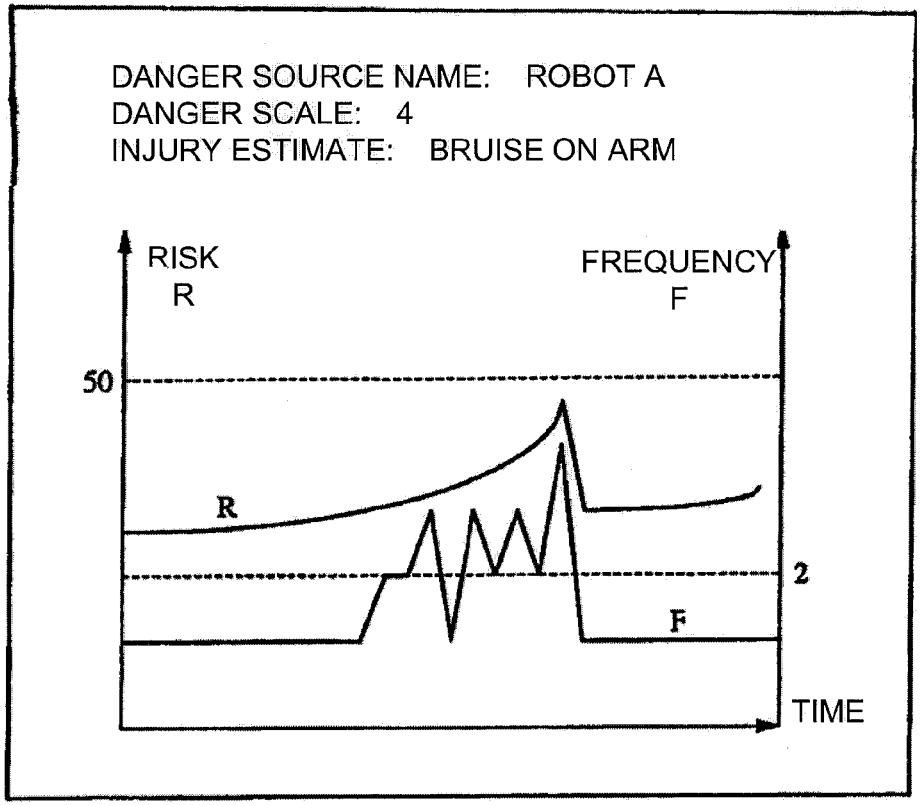
FIGS. 16A and 16B are examples of display format for the result of risk analysis.

Next, a risk evaluation value R is obtained for each danger source at a specified timing (sampling interval) (Step ST13) by substituting obtained values in the risk formula determined in Step ST6. FIG. 16A shows a trend display as an example of display format for the calculated risk evaluation value.

Next, if it is determined that a warning condition is not provided (NO in Step ST15), it is determined whether the condition for ending is satisfied (Step ST16). If a warning condition is provided (YES in Step ST15), a specified warning process is carried out (Step ST17 to Step ST18). Examples of warning condition include outputting an alarm, outputting the contents of the warning (details of abnormality) as a file, shutting off the system, making a trend display of the current risk value, displaying the danger source that caused the abnormality, displaying the cause of the abnormality, taking the time stamp of the time of generating the alarm and taking an event log of the alarm.

FIG. 16B is a pop-up table as an example of alarm processing that may be displayed on the trend table at the time of alarm processing. At the time of such a pop-up display, it is preferable to make the position of abnormality visually distinguishable, say, by changing the color of the abnormality position or by adding an underline. It is also preferable to prepare a table that correlates causes of abnormality with measures to be taken. If any of the current values from a result of observation exceeds a corresponding set value, such item may be displayed in the column for the causes and the corresponding measure may be read out of such a table and displayed.

A table such as shown in FIG. 15 may be displayed with the abnormal parts changed in color or underlined. Data at such a time are outputted as a file.

Figure 17A:
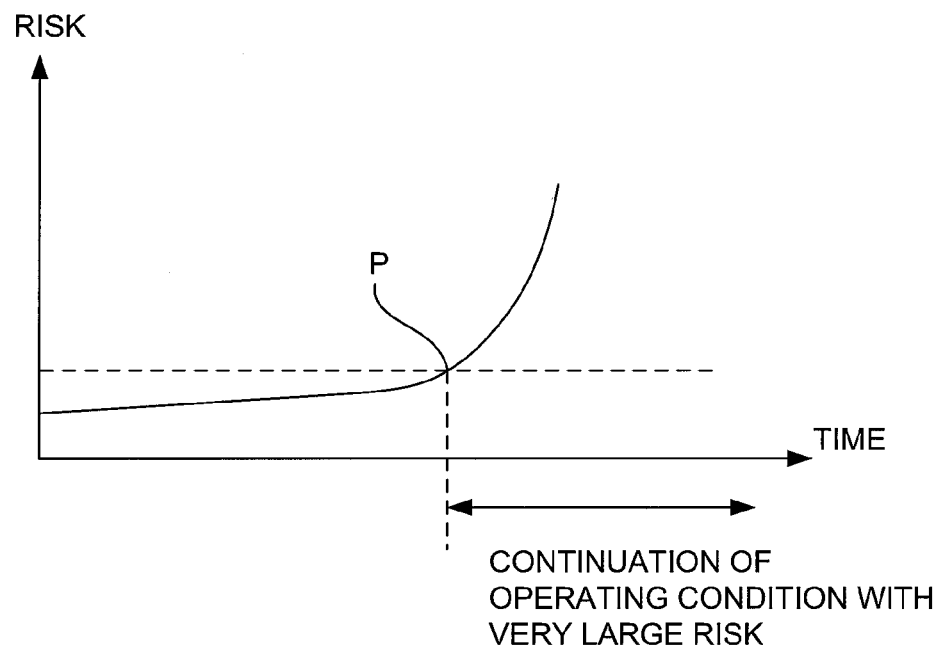
FIGS. 17A and 17B are graphs for showing the effects of this invention.
Figure 17B:
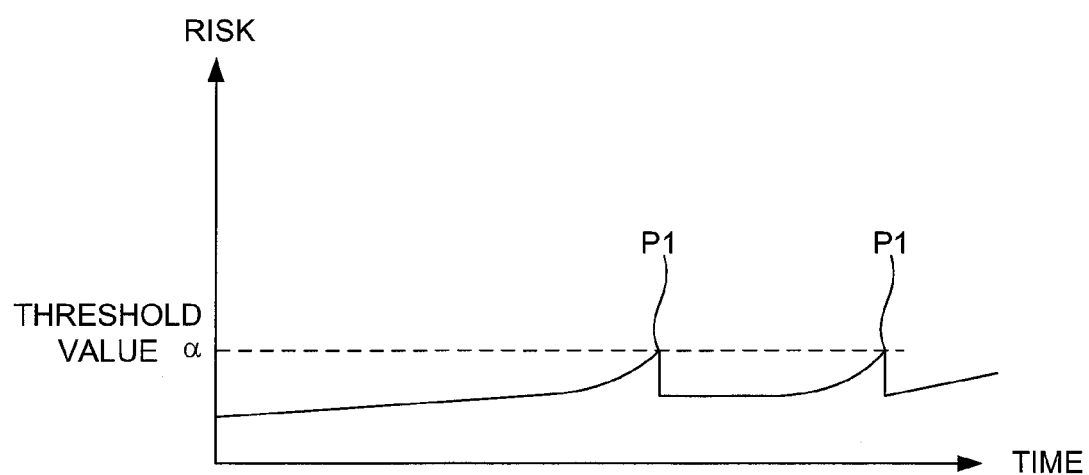

By such methods as explained above, the current magnitude of risk can be instinctively grasped. When the rate of increase in the risk is very fast as shown in the example of FIG. 17A although there is no visible sign of it, operations of the system may be resumed even after the response time becomes longer due, for example, to the mechanical fatigue of components such that the required condition of safety distance ceases to be satisfied (after the critical point P) if risk evaluation value is not obtained. According to the present invention, by contrast, the user can ascertain the current condition of the system by obtaining the risk evaluation value R such that a warning is outputted whenever the risk evaluation value R reaches a preset threshold value a (at points P1) and the user is able to take a measure at this timing to reduce the risk.

According to the embodiment of the invention described above, furthermore, a trend analysis on the cause of stopping the system is also carried out and hence devices can be exchanged or improved at a convenient timing and the frequency of stopping the system due to accidents and abnormalities can be significantly reduced. Since the risk data for each system configuration can be accumulated as a database, they can be passed over as a know-how that is convenient when a next system is to be designed. The accumulated data can also be outputted as a recording document for safety maintenance management such as a daily, weekly or month report or a risk evaluation list such that the trouble of creating documents can be dispensed with.

The devices connected to a network may be a mixture of safety devices and other kinds of devices. In such a case, their differences can be recognized from the specifications of the individual devices such that only the safety devices are selected for risk evaluation. Alternatively, risk evaluation may be made on both kinds of devices without distinguishing between safety devices and other devices. Data actually obtained at the time of designing a system may be used as an initial value to use as the set value for remainder risk. The time (date) when a threshold value is likely to be reached can be estimated from the rate of change in the remainder risk and may be reported as the number of days remaining for planning countermeasures to be taken such that various countermeasures may be prepared preliminarily.

Although examples with a support tool have been presented, the processes described above may be presented as a program to be carried out by a computer. Such programs may be made available in the form of computer readable recording media recording such programs. Examples of such recording medium include flexible disks and CD-ROMs. Programs stored on such a medium can be installed to an HD unit connected to (contained in) a computer through its FD drive or a CD-ROM drive such that the computer can serve as the support tool.

Explained more in detail, programs for carrying out the flowcharts described above are installed to the HD unit and transmitted from the HD unit to the internal memory whenever they are used such that various processes can be carried out at a fast speed. The memory 28 and the device database 29 may be realized in the form of an HD unit.

These programs need not be stored on a memory medium but may be themselves presented as program products. Then, the processing part for carrying out the flowcharts described above will comprise an application program (as a program product), being installed in a computer serving as the support tool 20 and executed by its CPU.

As explained above, a risk evaluation value is obtained based on the system condition of a safety network and hence risk evaluation can be carried out correctly in view of the real situation and since numbers are used, the level of the risk can be easily understood.

What is claimed is:

1. A risk evaluation support device for a safety system having a safety network connected to a controller, an input device and an output device, said safety network serving to cause said controller to output an enabling signal to said output device to thereby make a controlled device of a danger source operable based on a safety signal outputted from said input device when said input device detects a safety condition and to cause said controller to output a stop signal to said output device to thereby stop said controlled device of said danger source based on a danger signal outputted from said input device when said input device detects an unsafe condition, said risk evaluation support device comprising:

a communication interface connected to said safety network for communicating with each of the devices of said safety network;

table creating means for creating a parameter setting table for risk evaluation, said parameter setting table containing information correlating said input device and said output device related with said controlled device of said danger source of said safety system and operations thereof and item information that relates to operation history stored in said devices or operations of said safety system and becomes a danger condition for said controlled device of said danger source;

a recording medium;

recording means for storing said parameter setting table on said recording medium;

data obtaining means for obtaining operating data for said safety network corresponding to said item information of the danger condition of the controlled device of said danger source of said parameter setting table for risk evaluation stored by said recording means by communicating through said communication interface with the devices or by monitoring data flowing through said network;

calculating means for calculating a current risk evaluation value for said controlled device of said danger source by preliminarily recording a formula having danger conditions of said controlled device of said danger source as elements and substituting said obtained operating data into said elements of said formula; and outputting means for outputting data related to said risk evaluation value calculated by said calculating means;

wherein said parameter setting table for risk evaluation includes information showing in steps the magnitude of injury when said controlled device of said danger source contacts a person while in operation, and said calculating means includes at least an element in a calculation formula indicating the magnitude of the injury caused by said controlled device and calculates said risk evaluation value based at least on the scale of injury by said danger source based on said calculating formula.

2. The risk evaluation support device of claim 1 wherein said parameter setting table contains setting data that correlate observation parameters corresponding to items which become danger conditions for said controlled device of said danger source and standard evaluation values of said observation parameters, said observation parameters being related to said operation history stored in said input and output devices or to operations of said safety system; and wherein said calculating means obtains current values of said observation parameters based on said obtained operating data and calculates said current risk evaluation value for said controlled device of said danger source from said current value and said standard values.

3. The risk evaluation support device of claim 2 wherein said calculating means calculates said risk evaluation value at least based on data related to frequency of approach to said danger source.

4. The risk evaluation support device of claim 3 adapted to output an alarm when said risk evaluation value exceeds a preliminarily specified threshold value.

5. The risk evaluation support device of claim 2 adapted to output an alarm when said risk evaluation value exceeds a preliminarily specified threshold value.

6. The risk evaluation support device of claim 1 wherein said parameter setting table stores standard setting values of observation parameters correlated to risk elements related to maximum lifetimes of said input device and said output device; and wherein said calculating means obtains current values of said observation parameters based on said obtained operating data and calculates said current risk evaluation value for said danger source at least from said current value and said standard setting values.

7. The risk evaluation support device of claim 6 wherein said calculating means calculates said risk evaluation value at least based on data related to frequency of approach to said danger source.

8. The risk evaluation support device of claim 7 adapted to output an alarm when said risk evaluation value exceeds a preliminarily specified threshold value.

9. The risk evaluation support device of claim 6 adapted to output an alarm when said risk evaluation value exceeds a preliminarily specified threshold value.

10. The risk evaluation support device of claim 1 wherein said calculating means calculates said risk evaluation value at least based on data related to frequency of approach to said danger source.

11. The risk evaluation support device of claim 10 adapted to output an alarm when said risk evaluation value exceeds a preliminarily specified threshold value.

12. The risk evaluation support device of claim 1 adapted to output an alarm when said risk evaluation value exceeds a preliminarily specified threshold value.

* * * * *